United States Patent
Scherbarth

(10) Patent No.: US 7,365,652 B2
(45) Date of Patent: Apr. 29, 2008

(54) METHOD OF PILOT SUPPORT IN LANDING HELICOPTERS IN VISUAL FLIGHT UNDER BROWNOUT OR WHITEOUT CONDITIONS

(75) Inventor: Stefan Scherbarth, Markdorf (DE)

(73) Assignee: EADS Deutschland GmbH, Ottobrunn (DE)

( * ) Notice: Subject to any disclaimer, the term of this patent is extended or adjusted under 35 U.S.C. 154(b) by 182 days.

(21) Appl. No.: 11/133,389

(22) Filed: May 20, 2005

(65) Prior Publication Data
US 2006/0087452 A1 Apr. 27, 2006

(30) Foreign Application Priority Data
Oct. 23, 2004 (DE) ............. 10 2004 051 625

(51) Int. Cl.
*G01C 21/00* (2006.01)
(52) U.S. Cl. ............ 340/974; 340/971; 340/945; 340/980; 701/14; 701/16
(58) Field of Classification Search ......... 340/974, 340/971, 972, 973, 945, 961, 975, 980; 701/14, 701/1, 16
See application file for complete search history.

(56) References Cited

U.S. PATENT DOCUMENTS

| | | | |
|---|---|---|---|
| 5,296,854 A | | 3/1994 | Hamilton et al. |
| 5,675,328 A | * | 10/1997 | Coirier et al. ............. 340/975 |
| 5,745,863 A | * | 4/1998 | Uhlenhop et al. ........... 701/14 |
| 5,838,262 A | * | 11/1998 | Kershner et al. ........... 340/945 |
| 6,101,431 A | * | 8/2000 | Niwa et al. .................. 701/14 |
| 6,216,065 B1 | | 4/2001 | Hall et al. |
| 6,972,696 B2 | * | 12/2005 | Rogers et al. ............. 340/971 |
| 2004/0183697 A1 | | 9/2004 | Rogers et al. |

FOREIGN PATENT DOCUMENTS

| | | |
|---|---|---|
| DE | 2 214 119 A1 | 3/1972 |
| EP | 0911647 A2 | 4/1999 |
| WO | WO02-45048 A1 | 6/2002 |

OTHER PUBLICATIONS

P. Donaldson: "Brown-Out Surviaval-Technology of Training" Defence Helicopter, Mar. 2004, Seiten 10-12, XP009057682.
Eurpopean Search Report Dated Dec. 21, 2005, including English translation of relevant portion (Eleven (11) Pages).

* cited by examiner

*Primary Examiner*—Anh V. La
(74) *Attorney, Agent, or Firm*—Crowell & Moring LLP

(57) ABSTRACT

The invention relates to a method and system for supporting pilots in landing helicopters in visual flight under brownout or whiteout conditions. According to the invention, 3D data of the planned landing site are generated during the approach for landing, and are accumulated into a 3D representation of the landing site with the aid of position and attitude data of the helicopter. From this 3D representation, a virtual external view is continuously generated corresponding to the perspective of the actual position and attitude of the helicopter and is displayed for the pilot. A control routine ensures that no 3D data of the planned landing site that are generated under brownout or whiteout conditions are taken into account in the accumulation of the 3D representation.

20 Claims, 1 Drawing Sheet

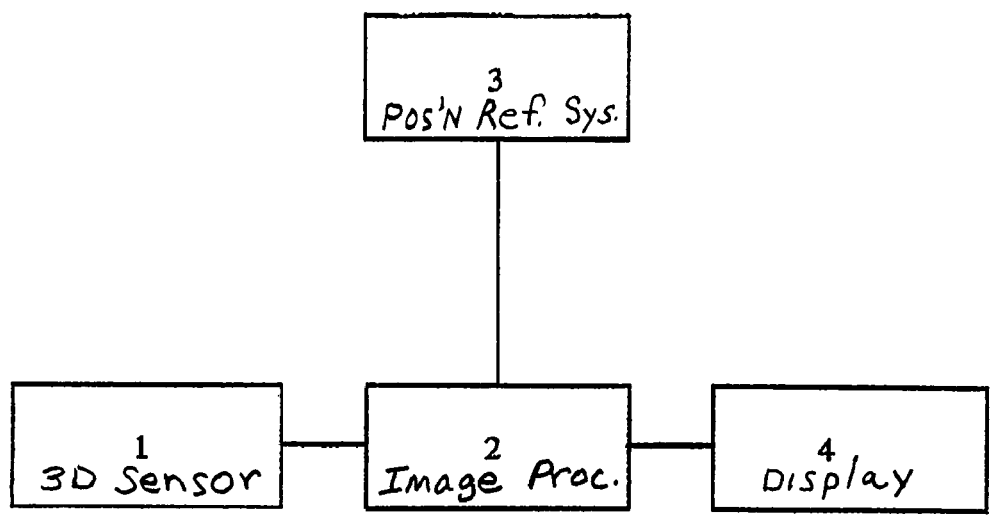

METHOD OF PILOT SUPPORT IN LANDING HELICOPTERS IN VISUAL FLIGHT UNDER BROWNOUT OR WHITEOUT CONDITIONS

BACKGROUND AND SUMMARY OF THE INVENTION

This application claims the priority of German patent document 10 2004 051 625.1, filed Oct. 23, 2004, the disclosure of which is expressly incorporated by reference herein.

The invention relates to a method for supporting pilots in landing helicopters in visual flight under brownout or whiteout conditions.

When helicopters approach for landing on a dusty or snow-covered landing field, whirling dust or snow suddenly and greatly restricts visibility in the final phase. This phenomenon, referred to as "brownout" or "whiteout", presents a significant risk in VFR (Visual Flight Rules) landings. The pilot can become disoriented with respect to the aircraft's attitude and altitude relative to the ground, as the whirling dust or snow gives him the impression that the helicopter is banking or nosing down. This situation frequently leads to accidents, and is the single most frequent cause of all helicopter crashes.

The article entitled "Brown-out survival—technology or training?" in the periodical "Defence Helicopter," Shepard, pp. 10-12, February/March 2004 issue, gives an instructive introduction to the problem of brownouts or whiteouts and suggests first approaches to technical solutions, which will be discussed briefly below.

According to the current state of the art, the pilot has instruments for instrument flight conditions available in correspondingly equipped helicopters. If brownout or whiteout conditions occur, these instruments can be used to land the aircraft under instrument flight rules, using, for example, the artificial horizon and the radar altimeter. A problem, however, is that in the critical phase just before landing, a complete switch is necessary from manual orientation based on the natural external view to orientation by means of abstract instrument information. This requires continued training of the pilots for this critical situation and still leads to many accidents.

Other proposals are known, which attempt to provide the pilot with auxiliary information provided by GPS-based sensors. Although this avoids the complexity of full Instrument Flight Rules instrumentation, it does not change the basic problem of the need to switch from sight orientation to instrument orientation.

It has also been proposed to use radar to detect the landing site through dust or snow. This technique fails, however, because of the currently available radars, the inadequate resolution and the minimum detection distance. The costs and weight of radar are also considerable. The ROSAR system proposed in German patent document DE 43 28 573 C2, for example, could in principle penetrate dust or snow under brownout or whiteout conditions and aid the pilot through visual representation of the radar echo at a given instant, but such a radar system is very costly and heavy, so that no ROSAR system is currently available on the market.

One object of the invention is therefore to provide a helicopter pilot with reliable flight support for VFR landings under brownout or whiteout conditions.

This and other objects and advantages are achieved by the method and apparatus according to the invention, in which the helicopter is equipped with a forward-looking high-resolution 3D sensor and a position reference system. The 3D sensor preferably has a resolution of at least 0.5° and a data rate greater than approximately 20,000 pixels/second. The 3D sensor continuously records the landing site during approach. The cumulative 3D data together with the attitude and position data of the position reference system of the helicopter are used to generate a natural virtual view of the landing site in a perspective corresponding to the actual attitude and position of the helicopter. This virtual external view is provided to the pilot by means of a display device (screen, head-up display, etc.). A control routine ensures that 3D data generated under brownout or whiteout conditions are not used in the calculation of the virtual external view. For this purpose, in a first possible embodiment, the incoming data are analyzed to detect brownout or whiteout conditions directly.

Current high-resolution 3D sensors are suitable only as VFR sensors; that is, they cannot penetrate a brownout or whiteout. At the instant when the brownout or whiteout occurs, it is automatically detected by means of the sensor data through image analysis using the 3D image of the dust cloud. During the brownout or whiteout, the pilot continues to be provided with the virtual view based on the 3D data obtained prior to the brownout or whiteout, such that the perspective is still continuously adapted to the actual helicopter position and attitude using the position reference data.

To ensure that 3D data generated during brownout or whiteout conditions are not used in the calculation of the virtual external view, as an alternative to the above-described direct detection of brownout or whiteout conditions, it may be provided that only 3D data generated during the approach above a specific predefined minimum flight altitude are used. The minimum altitude is selected such that brownout or whiteout conditions can still be reliably excluded above this minimum flight altitude—typically approximately 10-15 m. The altitude can be measured particularly by means of a radar altimeter. Below the minimum flight altitude, the pilot continues to be presented with the virtual external view based on the 3D data obtained above the minimum flight altitude, such that the perspective is continually adapted to the actual helicopter position and attitude using the position reference data.

The virtual external view should be adapted as quickly as possible to the flight progress of the helicopter. A refresh rate of at least 20 Hz is sufficient for this purpose.

Thus, the pilot has a high-resolution virtual external view of natural appearance available during the entire landing phase. Since the data of the 3D sensor system are accumulated during the approach and the points in space being detected continually change because of the flight movement, it is possible to achieve video-quality resolution. For example, an approach over 10 seconds at a data rate greater than 20,000 pixels/second yields more than 200,000 pixels. Since the perspective corresponds to the actual helicopter position and attitude at all times, the pilot can use this virtual view to estimate the attitude of the helicopter relative to the landing site at any time. When brownout or whiteout conditions occur, he can complete the landing using this virtual view without the need for a critical switch. Since brownout or whiteout conditions occur only at approximately 3-5 m above ground, it is sufficient to generate the virtual view from data obtained before this limited visibility occurs because it is generally unlikely that obstacles appear at the landing site during these last 3 seconds. A (currently unavailable) high-resolution sensor system that penetrates dust or snow is therefore not required.

The 3D sensor used is a range imaging sensor, particularly an imaging laser radar, such as described, for example in German patent document DE 39 42 770 C2 or German patent document DE 43 20 485 A1. The helicopter laser radar HELLAS by EADS Deutschland GmbH, Ottobrunn, Germany which provides 40,000 pixels/second at a range of up to 1 km, which is sufficient by far for this application, may be used as the 3D sensor, for instance. As an alternative, however, the 3D data may be generated in a manner known per se. For example, a stereo camera may be used for this purpose.

For the required position reference system many suitable devices are available on the market. One example is the inertial navigation system AH 2100 made by Honeywell. In a particularly preferred embodiment, the position reference system also uses the 3D data of the 3D sensor itself in addition to other sensor data to calculate the attitude and position data.

The required conversion of the 3D data into a photorealistic view from the perspective of the helicopter pilot is readily possible and cost-effective with the use of standard modern 3D visualization technology. In particular, OpenGL and DirectX may be used as the 3D interface for rendering 3D graphics.

To achieve a particularly realistic representation of the rendered scene, it is advantageous to take the following measures:

In addition to the 3D data, the color and gray scale distribution of the landing site is recorded by a color video camera. This makes it possible to generate the virtual external view so that it approximates the actual color and gray scale distribution of the landing site.

To enhance scene perception, sunlight with shadow formation may be simulated in the rendered scene based on the solar altitude, which is known from the position and the time of day.

Based on available cost-effective and low-weight sensors, the invention provides an overall reliable pilot aid for VFR landings under brownout or whiteout conditions.

Other objects, advantages and novel features of the present invention will become apparent from the following detailed description of the invention when considered in conjunction with the accompanying drawings.

BRIEF DESCRIPTION OF THE DRAWINGS

The single FIGURE schematically illustrates the essential components of one embodiment of the helicopter landing aid according to the invention.

DETAILED DESCRIPTION OF THE DRAWINGS

The 3D sensor 1 is mounted forward-looking on the helicopter, such that the planned landing site is in view during the approach. The 3D sensor supplies its data to the image processor 2, which continuously receives the position and attitude of the helicopter from the position reference system 3. The image processor uses the 3D sensor data accumulated over several seconds in conjunction with the position and attitude data to initially generate a high-resolution 3D representation of the landing site. The image processor 2 then uses this data to continuously generate the virtual view from the pilot's perspective, which is displayed by means of the display device 4, which can be a standard multifunction display or a head-up display. The image processor 2 is capable of detecting brownout or whiteout conditions without a major analysis effort, by image analysis using well known image processing techniques, and 3D data from the high resolution 3D sensor 1. The 3D data generated under brownout or whiteout conditions are not used to generate the virtual view of the landing site.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for supporting pilots in landing helicopters in visual flight under brownout or whiteout conditions, said method comprising:
   generating current 3D data of a planned landing site during an approach for landing;
   using an accumulation of said current 3D data, together with current position and attitude data of the helicopter, to generate a 3D representation of the landing site, which 3D representation continuously displays a virtual view of the landing site corresponding to the current actual position and attitude of the helicopter, which view is displayed for the pilot;
   detecting occurrence of a preset condition that is indicative of possible existence of a current brownout or whiteout of said landing site;
   upon detection of said condition, i) a control routine causing discontinuation of use of current 3D data of the planned landing site in generating the 3D representation; and ii) generating said 3D representation based on 3D data generated prior to detection of said condition, and on current actual position and attitude of the helicopter.

2. The method as claimed in claim 1, wherein:
   the control routine is configured such that the incoming 3D data are analyzed to determine existence of brownout or whiteout conditions; and
   said preset condition comprises determination of existence of said brownout or whiteout condition.

3. The method as claimed in claim 1, wherein:
   the control routine is configured such that the altitude of the helicopter above ground is continuously measured; and
   said preset condition is that the helicopter is below a predefined minimum altitude.

4. The method as claimed in claim 1, wherein the position reference system also uses the generated 3D data to calculate the attitude and position data.

5. The method as claimed in claim 1, wherein the virtual view is rendered photorealistically.

6. The method as claimed in claim 5, wherein:
   a color video camera records actual color and gray scale distribution of the landing site during the approach; and
   the virtual view is generated to approximate the actual color and gray scale distribution.

7. The method as claimed in claim 6, wherein to enhance the perception of the view, sunlight with shadow formation is simulated in the generated view as a function of solar attitude, which is known from position and the time of day information.

8. The method as claimed in claim 1, wherein an onboard 3D sensor with a resolution of at least 0.5° and a data rate greater than 20,000 pixels/second is used to generate the 3D data.

9. The method as claimed in claim 1, wherein the virtual view is displayed on a display screen or a head-up display.

10. The method as claimed in claim 1, wherein the 3D data for generating a 3D representation of the landing site are accumulated over a period longer than 1 second.

11. The method as claimed in claim 1, wherein the virtual view is generated with a refresh rate of at least 20 Hz.

12. A method for assisting a pilot in landing a helicopter in visual flight, said method comprising:
   a 3D sensor on board the helicopter generating 3D data of a landing site during an approach for landing at the landing site;
   a position reference system on board the helicopter generating attitude and position data during said approach for landing at the landing site;
   processing said 3D data and the attitude and position data to generate a virtual natural perspective view of the landing site;
   displaying said virtual natural perspective view to said pilot during said approach;
   detecting occurrence of brownout or whiteout conditions at said landing site by image analysis of said 3D data;
   during a detected occurrence of a brownout or whiteout condition, continuing to generate and display said virtual natural perspective view, based on said 3D data acquired prior to said occurrence of said brownout or whiteout conditions, by continuously adapting said virtual natural perspective view that is based on previously acquired 3D data, to correspond to actual current helicopter attitude and position using current attitude and position data from said position reference system.

13. The method according to claim 12, wherein the virtual natural perspective view is rendered photorealistically.

14. The method as claimed in claim 13, wherein:
   a color video camera records the actual color and gray scale distribution of the landing site during the approach; and
   the virtual natural perspective view is generated to approximate the actual color and gray scale distribution.

15. The method as claimed in claim 14, wherein to enhance the perception of the view, sunlight with shadow formation is simulated in the generated view as a function of solar attitude, which is known from position and the time of day information.

16. The method as claimed in claim 15, wherein the virtual natural perspective view is displayed on a display screen or a head-up display.

17. A system for assisting a pilot in landing a helicopter in visual flight, said system comprising:
   a 3D sensor on board the helicopter, for generating 3D data of a landing site during an approach for landing at the landing site;
   a position reference system on board the helicopter, for generating attitude and position data during said approach for landing at said landing site;
   a visual display which is observable by said pilot; and
   an image processing system, coupled to receive 3D data from said 3D sensor, and attitude and position data from said position reference system;
   wherein said image processing system is programmed to execute the following routines,
   generating a virtual natural perspective view of said landing site, based on said attitude and position data and said 3D data;
   displaying said virtual natural perspective view to said pilot during said approach;
   detecting occurrence of brownout or whiteout conditions at said landing site by image analysis of said 3D data;
   during a detected occurrence of a brownout or whiteout condition, continuing to generate and display said virtual natural perspective view, based on said 3D data acquired prior to said occurrence of said brownout and whiteout conditions, by continuously adapting said virtual natural perspective view that is based on previously acquired 3D data, to correspond to actual current helicopter attitude and position using current attitude and position data from said position reference system.

18. The system as claimed in claim 17, wherein:
   a color video camera records the actual color and gray scale distribution of the landing site during the approach; and
   the virtual natural perspective view is generated to approximate the actual color and gray scale distribution.

19. The system as claimed in claim 18, wherein to enhance the perception of the view, sunlight with shadow formation is simulated in the generated view as a function of solar attitude, which is known from position and the time of day information.

20. The system as claimed in claim 19, wherein the virtual natural perspective view is displayed on a display screen or a head-up display.

* * * * *